United States Patent Office 3,419,435
Patented Dec. 31, 1968

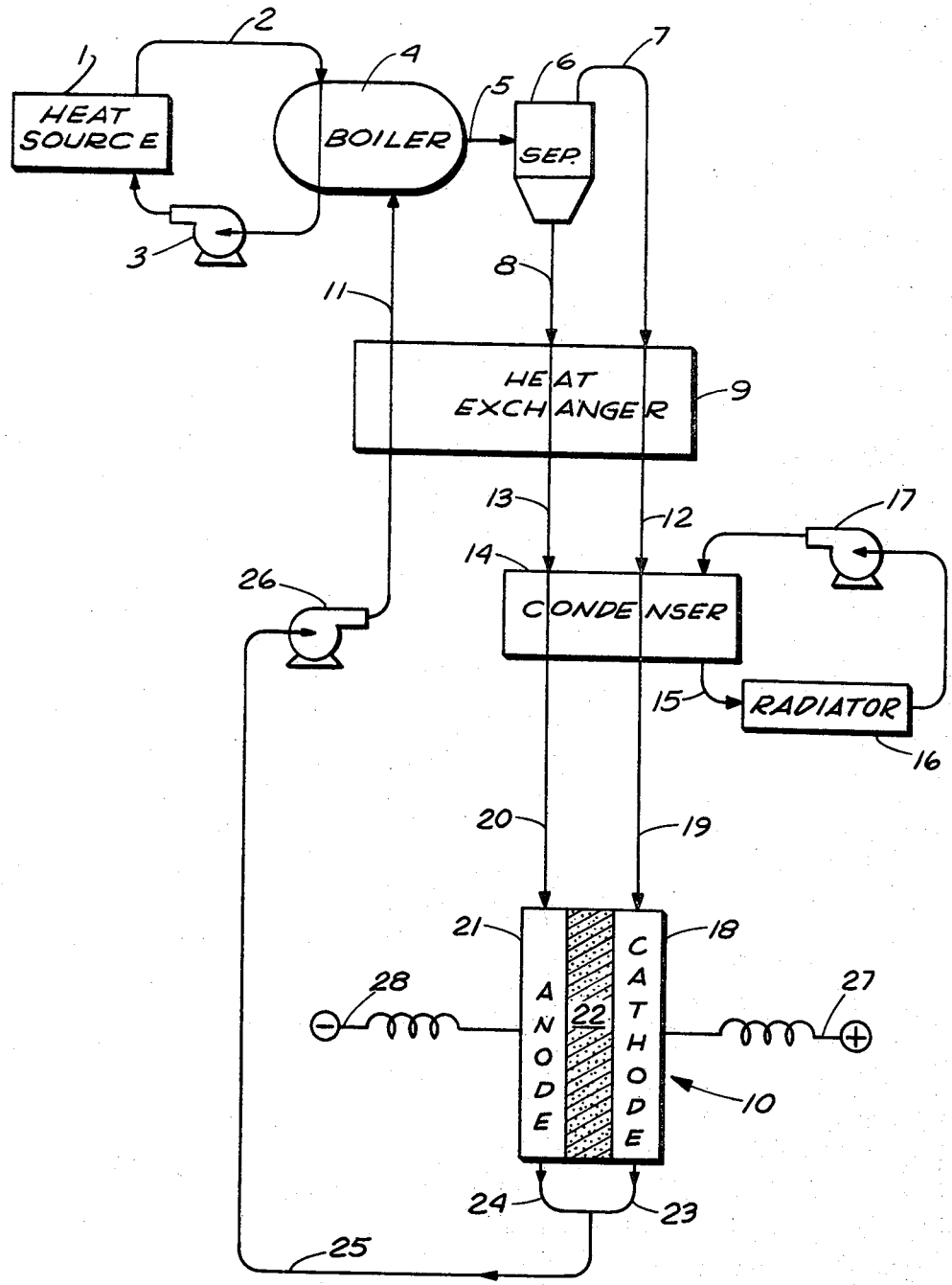

3,419,435
ENERGY CONVERSION PROCESS AND
APPARATUS
Howard L. Recht, Northridge, and Donald E. McKenzie, Woodland Hills, Calif., assignors to North American Rockwell Corporation, a corporation of Delaware
Filed Apr. 2, 1965, Ser. No. 444,976
2 Claims. (Cl. 136—100)

ABSTRACT OF THE DISCLOSURE

A sodium-amalgam galvanic cell operative at a temperature below about 500° C. and a process for converting heat to electricity utilizing this cell. The sodium-amalgam anode of the cell contains between 35 and 40 atom percent sodium, the sodium-amalgam cathode of the cell contains between 0.1 and 1 atom percent sodium, and a porous ceramic matrix which separates the anode and cathode amalgams contains a fusible electrolyte which is a ternary salt mixture of eutectic composition consisting essentially of, in mole percent, 58±1 sodium cyanide, 30±1 sodium iodide, and 12±1 sodium fluoride.

This invention relates to a process and apparatus for the conversion of thermal energy to electrical energy. More particularly it relates to a novel alkali metal-amalgam galvanic cell or battery as a thermal energy conversion device.

A thermally regenerative energy conversion system is a closed cycle heat engine for converting heat energy to electricity without the use of moving parts such as turbines or other rotating machinery. Galvanic cells have been heretofore considered for use as components in such thermally regenerative systems. See "The Thermally Regenerative Liquid-Metal Cell" by B. Agruss, Journal of the Electrochemical Society, vol. 110, pp. 1097–1103 (1963); "Mercury Space Power Systems" by R. E. Henderson and E. H. Hietbrink, in Direct Conversion, 1962 Pacific Energy Conversion Conference Proceedings, pp. 16–1 to 16–12 (1962). Generally, such cells have been of limited practical interest because of the presence of several of the following deficiencies: low single cell voltage, low cell current density, difficulty of materials handling and regeneration, lack of compatibility with usable heat sources, and cell component corrosion in resulting in short cell life.

Accordingly, it is an object of the present invention to provide a galvanic cell for use in a thermally regenerative system that minimizes prior art disadvantages heretofore present.

Another object is to provide a galvanic cell with improved resistance to cell component corrosion.

Still another object is to provide a cell with a relatively high power to weight ratio.

Still another object is to provide a galvanic cell with increased cell life for both space and terrestrial applications.

Yet another object is to provide an improved thermally regenerative alkali metal-amalgam system.

An additional object is to provide a high efficiency energy conversion process utilizing the novel galvanic cell.

In accordance with this invention there is provided an improved thermally regenerative alkali metal-amalgam system and process utilizing a galvanic cell whose anode consists of an alkali metal-rich amalgam of a selected alkali metal, the cathode consists of an alkali metal-poor amalgam of said alkali metal, and the electrolyte is an anhydrous salt of the said alkali metal, the anion of the electrolyte being selected from the class consisting of halide, cyanide, carbonate, and mixtures thereof, carbonate being present only as a minor constituent. The cathode and anode amalgams and the electrolyte salt are all molten at the normal operating temperature of the cell. The term "cell" as used herein is broadly intended also to include a "battery," e.g., an assemblage in series or parallel arrangement of two or more electric cells.

While this invention is broadly directed to an energy conversion process and system utilizing an alkali metal-amalgam cell or battery, with one-stage or multiple-stage regeneration, it is preferred for most advantageous operation that the alkali metal component of the anode, cathode and electrolyte be sodium. In its more specific aspects, it is particularly preferred that the anode amalgam of the galvanic cell contain between 15 and 80 atom percent sodium, the cathode amalgam contain up to 10 atom percent sodium and the electrolyte consist of mixed sodium salts, the anionic components being selected from the aforementioned class.

Other objects, advantages, and features of the invention will appear from the following description of a preferred embodiment of the invention relating to a sodium-amalgam cell, wherein the sole figure of the drawing is a schematic representation of a thermally regenerative alloy cell system employing this preferred sodium-amalgam galvanic cell.

Referring to the drawing, a heat source 1 is used to heat a fluid which is circulated in a closed conduit loop 2 by means of a pump 3 through a boiler 4. Conveniently, for space applications, the heat source is a nuclear reactor and the circulating heat-transfer fluid is sodium-potassium liquid metal. This fluid may be circulated utilizing an electromagnetic pump, thereby eliminating moving mechanical parts. Heat source 1 may also be a radioisotope, e.g., plutonium-238 for a long-term space mission or cerium-144 for a short-term mission. These heat sources are also suitable for terrestrial applications. For other applications, particularly where conventional sources of heat are employed such as fossil fuels, the heat source loop may be eliminated and the boiler heated directly.

Where sodium is the alkali metal used, a boiler temperature below the boiling point of sodium and preferably between 1200° F. and 1400° F. (650–750° C.) is maintained. In this preferred embodiment, the sodium-mercury mixture in the boiler contains preferably between 10 and 20 atom percent sodium. The heated sodium-amalgam mixture in boiler 4 passes through a conduit 5 to a separator 6, where the mixture is separated into a sodium-poor vapor, e.g., mercury vapor containing between 0 and 10 atom percent sodium, and a sodium-rich liquid amalgam containing between 15 and 80 atom percent sodium. The specific composition of the separated components is determined by boiler efficiency and the temperature and pressure maintained in the boiler. The separator is conveniently a centrifugal cyclone type because of its high collection efficiency. Where the source temperature is high, above 1400° F., the mercury vapor stream may contain excessive amounts of sodium. This can be minimized by using at least a two-stage separation.

At a temperature of 1300° F. and a system pressure of about 125 p.s.i.a. the mercury vapor passing through an overhead conduit 7 of separator 6 contains approximately 0.4 atom percent (a/o) sodium. This sodium-poor mercury vapor, following condensation, constitutes the cathode stream. The anode stream consists of molten sodium-amalgam which passes through a bottom conduit 8. At 1300° F. this liquid stream contains approximately 37.5 a/o sodium.

The anode and cathode streams pass through a heat exchanger 9 wherein heat is given up to a recycle effluent stream form a galvanic cell 10, this stream being returned to boiler 4 through a conduit 11. The cathode and anode streams pass from heat exchanger 9 through respective conduits 12 and 13 to a condenser-cooler 14 wherein the streams are further cooled and the mercury vapor of the cathode stream is condensed.

For convenience in schemtic representation, condenser-cooler 14 has been shown as a separate unit from heat exchanger 9. Similarly, boiler 4 has been shown as a separate unit from separator 6. However, for optimizing system weight and efficiency, particularly for space applications, it may be desirable to combine the boiler and separator in one unit and also to combine the heat exchanger and condenser-cooler. Since the system described herein is a heat engine that is Carnot-cycle limited, its efficiency is increased by maintaining a maximum feasible difference in temperature between that of boiler 4 and that at which galvanic cell 10 is operated. Waste heat may be additionally rejected to space be means of a fluid circulating through a closed conduit loop 15 to a radiator 16, circulated by means of a pump 17. The condenser-cooler 14 and radiator 16 may be combined where direct radiation of waste heat is desired. Thereby, circulation of a heat-transfer fluid through external loop 15 is eliminated.

The sodium-poor amalgam stream enters a cathode compartment 18 of galvanic cell 10 by way of conduit 19. Similarly, the sodium-rich amalgam stream is conducted by way of conduit 20 to an anode compartment 21 of galvanic cell 10.

An electrolyte compartment 22 which separates the cathode and anode compartments 18 and 21, consists of a porous ceramic matrix in which the electrolyte is contained. It is considered a particularly important and critical feature of this invention, in order to insure maximum cell life, high efficiency, and freedom from corrosion, which combined features result in a cell of practical utility, that the molten anhydrous alkali metal salt be substantially non-oxidizing and have its anion component selected from the class consisting of halide, cyanide, carbonate and mixtures thereof, carbonate where present being only a minor constituent in the mixture.

Galvanic cell 10 is maintained at a temperature that is suitably lower than the boiler temperature but sufficient to maintain the cathode and anode amalgams and the electrolyte in a molten state. In the galvanic cell, sodium ions from the sodium-rich amalgam in the anode compartment migrate through the molten electrolyte to the cathode compartment where they unite with the mercury to form a sodium-poor amalgam of higher sodium content than originally present in the cathode compartment. At the same time, the sodium-rich amalgam in the anode compartment is depleted to form a sodium-poor amalgam. The sodium-poor amalgam effluent from the cathode compartment, emerging from a conduit 23, and the sodium-poor effluent amalgam of the anode compartment, emerging from a conduit 24, are combined and conducted by way of a conduit 25 utilizing a pump 26 through heat exchanger 9, and then returned by way of conduit 11 to boiler 4 for regeneration and recycle in the system. The anode and cathode effluent streams may be of the same or different composition depending on the relative flow rates selected of these streams based on consideration of overall efficiency and specific power output.

An electrical load (not shown) is conveniently connected across a positive terminal 27 and a negative terminal 28 of the galvanic cell. Since heat is being continually supplied by heat source 1 and electricity is being removed from the cell by way of terminals 27 and 28, this thermally regenerative system provides an efficient continuous energy conversion process for the conversion of heat to electricity. The following reactions (equations not balanced) occur in the system during operation:

Boiler (and regenerative heat exchanger):

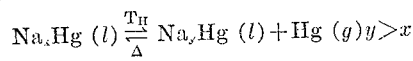

Separator:

$$Na_yHg(l) + Hg(g) \rightarrow Na_yHg(l)\downarrow + Hg(g)\uparrow$$

Condenser:

$$Hg(g) \rightarrow Hg(l) + \text{heat}$$

Galvanic cell:

(a) Overall

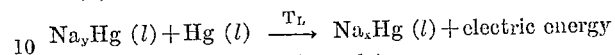

(b) Anode (negative electrode)

$$Na_yHg(l) \rightarrow Na_xHg(l) + Na^+ + e^-$$

(c) Electrolyte

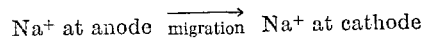

(d) Cathode (positive electrode)

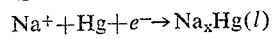

The sodium-amalgam mixture may be employed as the working medium over a broad range of heat source ($T_H$) temperature and cell ($T_L$) and heat-sink temperatures. However, for preferred operating conditions, the heat source utilized is best available in the range 550° C. to 900° C. with a particularly preferred range from 600° C. to 725° C. The cell temperature is best utilized in the range 250° C. to 600° C. with a preferred range from 360° C. to 500° C. depending on freezing point of amalgam and electrolyte. The heat-sink temperature accordingly will be sufficiently lower than the cell temperature to permit rejection of all degraded heat.

Particularly suitable and preferred for use as the electrolyte salt is a sodium salt eutectic mixture consisting of approximately 58 mole percent sodium cyanide, 30 mole percent sodium iodide and 12 mole percent sodium fluoride. It has been found that where this molten electrolyte is contained in a high porosity beryllium oxide ceramic matrix, particularly superior results are produced with respect to cell life and operability. This preferred electrolyte and the porous beryllia matrix therefor are respectively described and claimed in copending applications S.N. 444,955 and S.N. 444,956, filed of even date herewith and assigned to the assignee of the present invention.

Of the suitable alkali metals, lithium, potassium, and sodium for use in the thermally regenerative cell system, the sodium-amalgam system is particularly preferred because better separation of the mercury from the sodium is obtained, and sodium has a lower vapor pressure in the system at a given regeneration temperature. In addition, corrosion at a given temperature is less in a sodium-containing system than one utilizing potassium. Furthermore, since the equivalent weight of sodium is less than that for potassium, with approximately equal cell voltages for the two systems a given power capability will require less weight in the sodium system. The mixture of molten sodium salts is also less soluble in the metal electrodes; similarly, these metal electrodes are less soluble in the electrolyte for a sodium system than for a potassium one.

The following examples are illustrative of this invention but are not intended to restrict the scope thereof as previously described.

EXAMPLE 1

A sodium-amalgam galvanic cell was operated at a temperature between 470° C. and 510° C. The electrolyte was contained in a porous beryllia matrix separating the cathode and anode amalgams. The electrolyte consisted of a eutectic mixture of 58 mole percent sodium cyanide, 30 mole percent sodium iodide, and 12 mole percent sodium fluoride, having a melting point of approximately 475° C. The resistivity of the pure fused salt mixture was 0.5 ohm-cm. and the resistivity of the electrolyte-matrix combination was between 3.0 and 3.5 ohm-cm. The cell was operated at current densities in the range of 80 to 150 ma./cm.$^2$, with a maximum current density drawn of 360 ma./cm.$^2$ and a maximum power density of 160 mw./cm.$^2$. Cathode and anode amalgam feeds corresponding to open circuit voltages in the range 0.2 to 0.8 v. were studied. The measured voltages were found to match theoretical values. For an anode amalgam containing 50 atom percent sodium and a cathode amalgam containing 1 atom percent sodium, a voltage of 0.77 v. was obtained. With an anode amalgam content of 35 atom percent sodium and a cathode amalgam content of 10 atom percent sodium, the voltage was 0.41 v. The cell was operated continuously for 176 hours with no evidence of cell deterioration.

EXAMPLE 2

The regeneration loop for the sodium-mercury alloy cell consisted basically of a boiler, a liquid-vapor separator, a vapor condenser, a pump, and connecting tubing. All components were made of stainless steel. The boiler was electrically heated, using about a 5-kilowatt power input, and the condenser was water cooled. An electromagnetic pump and electromagnetic flow meters were also used. The boiler and separator were designed to operate under zero gravity conditions, with the entire loop capable of producing 250–500 watts of electricity at 5 to 10% overall efficiency.

The loop was filled with 450 milliliters of mercury and 115 grams of sodium, combining to make a sodium-sodium amalgam mixture containing 14 atom percent sodium with a melting point of about 280° F. The boiler temperature was raised to 1000° F. and boiling and condensing of mercury vapor took place. A temperature of 1200° F. was maintained at the boiler. The flow through the boiler tube was from top to bottom in a simulation of zero gravity conditions. The separator was designed as a centrifugal cyclone separator. Mercury vapor and liquid amalgam enter the separator tangentially and their velocities cause them to spin around the inside wall of the inlet section. This spinning forces the vapor to the center of the tube, from which it exits to the top of the separator to the condenser. The liquid amalgam passes out through the bottom of the tube. Since the cyclone design does not require gravity to operate, it also simulates zero gravity conditions. A gas blanket of argon was used to control pressure in the system.

Samples of enriched amalgam composition taken from the separator during operation were found to be 35 atom percent sodium at 1200° F. and 90 p.s.i.a. and 17 atom percent sodium at 1000° F. and 90 p.s.i.a. These values correspond to a one-theoretical-plate distillation. The system operation corresponded to a generated voltage of 0.652 volt for the operation of two cells in series on an open-circuit basis.

It will of course be understood that various modifications can be made in the design and operation of the galvanic cell and thermally regenerative system herein described without departing from the spirit of the invention. For example, where the cathode and anode effluents differ in composition, it may be useful to regenerate the cathode effluent in a first stage regenerator, then combining the enriched amalgam produced with the anode effluent. Thus while the principle, preferred construction and mode of operation of the invention have been illustrated and described, it should be understood that within the scope of the appended claims the invention may be practiced otherwise than as specifically illustrated and claimed.

We claim:

1. A galvanic cell for use in a thermally regenerative system comprising an anode of a sodium amalgam containing between 35 and 40 atom percent sodium, a cathode of a sodium amalgam containing between 0.1 and 1 atom percent sodium, the overall composition of the sodium and mercury working fluid in the system containing between 10 and 20 atom percent sodium, a porous ceramic matrix separating the anode and cathode amalgams, and an electrolyte contained in said matrix, consisting of a ternary salt mixture of eutectic composition consisting essentially of, in mole percent, 58±1 sodium cyanide, 30±1 sodium iodide, and 12±1 sodium fluoride the cathode and anode amalgams and the electrolyte being molten at the normal operating temperature of the cell below about 500° C.

2. An energy conversion process for the conversion of heat to electricity comprising heating in a boiler at a selected temperature between 550° C. and 900° C. and pressure a sodium-amalgam mixture containing between 10 and 20 atom percent sodium, separating said mixture into a mercury vapor stream and sodium-rich amalgam stream, said temperature and pressure being selected to provide between 0.1 and 1 atom percent sodium by weight of the mercury vapor stream and between 35 and 40 atom percent sodium by weight of the sodium-rich amalgam stream, cooling said streams and condensing said mercury vapor, feeding the sodium-rich amalgam stream at a first selected rate to the anode compartment of a galvanic cell, feeding the condensed mercury stream at a second preselected rate to the cathode compartment of said galvanic cell, whereby by interaction of the cathode and anode streams through an electrolyte consisting of a ternary salt mixture of eutectic composition consisting essentially of, in mole percent, 58±1 sodium cyanide, 30±1 sodium iodide, and 12±1 sodium fluoride there is a resultant production of electrical energy, said preselected rates being correlated to provide a particular efficiency and specific power output of the system, the cathode and anode amalgams and the electrolyte being molten at the normal operating temperature of the cell below about 500° C. and circulating the effluent products from said cathode and anode compartments to the boiler for recycle in the process.

References Cited

UNITED STATES PATENTS 3,245,836   4/1966   Agruss _____ 136—83

WINSTON A. DOUGLAS, *Primary Examiner.*

C. F. LE FEVOUR, *Assistant Examiner.*

U.S. Cl. X.R.

136—6, 83